US011941362B2

(12) United States Patent
Campos Ortega et al.

(10) Patent No.: US 11,941,362 B2
(45) Date of Patent: Mar. 26, 2024

(54) SYSTEMS AND METHODS OF ARTIFICIALLY INTELLIGENT SENTIMENT ANALYSIS

(71) Applicant: Early Warning Services, LLC, Scottsdale, AZ (US)

(72) Inventors: Edwin F. Campos Ortega, Naperville, IL (US); Eric D. First, Chicago, IL (US); Deepakshi Aswal, Scottsdale, AZ (US); Jie He, Naperville, IL (US)

(73) Assignee: Early Warning Services, LLC, Scottsdale, AZ (US)

( * ) Notice: Subject to any disclaimer, the term of this patent is extended or adjusted under 35 U.S.C. 154(b) by 282 days.

(21) Appl. No.: 16/859,301

(22) Filed: Apr. 27, 2020

(65) Prior Publication Data
US 2021/0334466 A1 Oct. 28, 2021

(51) Int. Cl.
*G06F 40/30* (2020.01)
*G06F 40/289* (2020.01)
*G06N 20/00* (2019.01)

(52) U.S. Cl.
CPC .......... *G06F 40/30* (2020.01); *G06F 40/289* (2020.01); *G06N 20/00* (2019.01)

(58) Field of Classification Search
CPC ........ G06F 40/30; G06F 40/289; G06N 20/00
See application file for complete search history.

(56) References Cited

U.S. PATENT DOCUMENTS

| | | | |
|---|---|---|---|
| 8,554,701 B1* | 10/2013 | Dillard | G06F 40/30 706/12 |
| 9,317,566 B1* | 4/2016 | L'Huillier | G06F 16/951 |
| 10,037,491 B1* | 7/2018 | Fang | G06F 21/6218 |
| 2015/0112753 A1* | 4/2015 | Suvarna | G06Q 50/01 705/7.29 |
| 2016/0042359 A1* | 2/2016 | Singh | G06F 40/30 704/2 |
| 2016/0342683 A1* | 11/2016 | Lim | G06F 16/35 |
| 2018/0077088 A1* | 3/2018 | Cabrera-Cordon | G06F 16/90335 |
| 2019/0286714 A1* | 9/2019 | Vernier | G06F 16/24522 |
| 2020/0364511 A1* | 11/2020 | Brown | G06N 3/084 |
| 2021/0232943 A1* | 7/2021 | Abishek Kumar | G06F 40/284 |

* cited by examiner

*Primary Examiner* — Pierre Louis Desir
*Assistant Examiner* — Keisha Y. Castillo-Torres
(74) *Attorney, Agent, or Firm* — Kilpatrick Townsend & Stockton LLP (57) ABSTRACT

A method of providing sentiment analysis includes training a computer system to identify a polarity of a sentiment for a plurality of phrases and receiving, at the computer system, an input from a website. The input includes a text string including a phrase. The method includes determining, by the computer system, the polarity of the sentiment of the phrase by comparing the phrase to the plurality of phrases and sending, by the computer system, a command to the website that causes the website to display predetermined content based on the determined polarity of the sentiment of the phrase.

17 Claims, 9 Drawing Sheets

SYSTEMS AND METHODS OF ARTIFICIALLY INTELLIGENT SENTIMENT ANALYSIS

BACKGROUND OF THE INVENTION

There is a vast and rich collection of public opinion data available in online product reviews, blog posts, and social media outlets. Common practices to recognize brand public opinion are based on humans reading online articles, survey, or reviews to discern positive or negative sentiment from the text. Such tasks may take from minutes to days to complete, depending on the amount of text. As a result, there have been efforts made to provide computerized sentiment analysis tools. However, conventional sentiment analysis techniques are performed using local computers and require an instance of sentiment analysis software to be present on each computer that is performing the sentiment analysis.

BRIEF SUMMARY OF THE INVENTION

Embodiments of the present invention are directed to systems and methods for providing cloud-based sentiment analysis tools. These tools are trained using machine learning and are then able to take in a user comment, such as from a formal product review and/or a social media post, and provide a real-time response to the comment via a frontend website. Thus, embodiments, allow any user with a network-capable computing device to have instantaneous sentiment analysis performed on a comment, without the need to have an instance of the sentiment analysis model software stored and installed on their computing device.

In one embodiment, a method of providing sentiment analysis is provided. The method may include training a computer system to identify a polarity of a sentiment for a plurality of phrases and receiving, at the computer system, an input from a website. The input may include a text string including a phrase. The method may also include determining, by the computer system, the polarity of the sentiment of the phrase by comparing the phrase to the plurality of phrases and sending, by the computer system, a command to the website that causes the website to display predetermined content based on the determined polarity of the sentiment of the phrase.

In some embodiments, training the computer system may include classifying each of a plurality of comments as being positive or negative based on scores associated with each of the plurality of comments, generating the plurality of phrases from the plurality of comments, and assigning each of the plurality of phrases the polarity of the sentiment based at least in part on the scores associated with each of the plurality of comments. In some embodiments, generating the plurality of phrases may include removing one or more of single-letter words, two-letter words, words on a pre-defined list, punctuation, or numbers from each of the plurality of comments to form sets of remaining words for each of the plurality of comments. Generating the plurality of phrases may also include lemmatizing the sets of remaining words for each of the plurality of comments to generate the plurality of phrases. In some embodiments, training the computer system further involves removing comments that are classified as being neutral. In some embodiments, the predetermined content may include a pre-determined text-based message that is selected based at least in part on the polarity of the sentiment of the phrase. In some embodiments, the predetermined content may include a textual response to the phrase. In some embodiments, the method may include extracting the phrase from the text string by removing one or more of single-letter words, two-letter words, words on a pre-defined list, punctuation, or numbers from the text string. Any remaining words of the phrase may be lemmatized prior to determining the polarity of the sentiment of the phrase.

In another embodiment, a computing system for providing sentiment analysis is provided. The computing system, such as a local computer and/or server, may include a communications interface that is in communication with a website, a processor, and a memory having instructions stored thereon. When executed by the processor, the instructions cause the processor to train the computer system to identify a polarity of a sentiment for a plurality of phrases and receive, using the communications interface, an input from the website. The input may include a text string including a phrase. The instructions may also cause the processor to determine the polarity of the sentiment of the phrase by comparing the phrase to the plurality of phrases and send, using the communications interface, a command to the website that causes the website to display predetermined content based on the determined polarity of the sentiment of the phrase.

In some embodiments, the predetermined content is selected based at least in part on the polarity of the sentiment of the phrase and on the content of the phrase. In some embodiments, the predetermined content may include a color being displayed around the input. The color may be selected based on the polarity of the sentiment of the phrase. In some embodiments, the instructions may further cause the processor to translate the text string into a different language prior to determining the polarity of the sentiment of the phrase. In some embodiments, training the computer system includes classifying each of a plurality of comments as being positive or negative based on scores associated with each of the plurality of comments, generating the plurality of phrases from the plurality of comments, and assigning each of the plurality of phrases the polarity of the sentiment based at least in part on the scores associated with each of the plurality of comments. In some embodiments, generating the plurality of phrases may include removing one or more of single-letter words, two-letter words, words on a pre-defined list, punctuation, or numbers from each of the plurality of comments to form sets of remaining words for each of the plurality of comments. The sets of remaining words for each of the plurality of comments may be lemmatized to generate the plurality of phrases. In some embodiments, the instructions further cause the processor to extract the phrase from the text string by removing one or more of single-letter words, two-letter words, words on a pre-defined list, punctuation, or numbers from the text string. Any remaining words of the phrase may be lemmatized prior to determining the polarity of the sentiment of the phrase.

In another embodiment, a non-transitory computer-readable medium having instructions stored thereon is provided. The instructions, when executed, cause a computing device to train the computer system to identify a polarity of a sentiment for a plurality of phrases and receive an input from the web site. The input may include a text string including a phrase. The instructions may also cause the computing device to determine the polarity of the sentiment of the phrase by comparing the phrase to the plurality of phrases and send a command to the website that causes the website to display predetermined content based on the determined polarity of the sentiment of the phrase.

In some embodiments, the instructions are further configured to cause the computing device to translate the text string into a different language prior to determining the polarity of the sentiment of the phrase. In some embodiments, training the computer system may include classifying each of a plurality of comments as being positive or negative based on scores associated with each of the plurality of comments, generating the plurality of phrases from the plurality of comments, and assigning each of the plurality of phrases the polarity of the sentiment based at least in part on the scores associated with each of the plurality of comments. In some embodiments, generating the plurality of phrases may include removing one or more of single-letter words, two-letter words, words on a pre-defined list, punctuation, or numbers from each of the plurality of comments to form sets of remaining words for each of the plurality of comments. The sets of remaining words for each of the plurality of comments may be lemmatized to generate the plurality of phrases. In some embodiments, the instructions further cause the computing device to extract the phrase from the text string by removing one or more of single-letter words, two-letter words, words on a pre-defined list, punctuation, or numbers from the text string. Any remaining words of the phrase may be lemmatized prior to determining the polarity of the sentiment of the phrase. In some embodiments, the predetermined content may include one or more of a textual response to the phrase or a color being displayed around the input. The color may be selected based on the polarity of the sentiment of the phrase.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a set of parentheses containing a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

Embodiments of the present invention are directed to systems and methods that utilize supervised machine-learning techniques to provide a cloud-based sentiment analysis tool. This tool is capable of analyzing an input (such as a typed and/or pasted in comment, review, social media post, etc.) and producing an output in real-time that is indicative of the sentiment of the input. In some embodiments, the output may not only be indicative of the input, but may also be customized based on a topic of the input. Such solutions enable instantaneous review and analysis of comment/review and allow tailored feedback to be provided to a user of a website, without the need for the user's computing device to include an instance of sentiment analysis software.

Embodiments may utilize a backend service model that has been trained to analyze the sentiment of a particular comment. For example, the backend service model may be trained to correlate certain terms and/or phrases with a particular sentiment. For example, during training, comments associated with a particular score that indicates the polarity of each of the comments may be broken up into various phrases (terms and/or groups of terms). As used herein, the term polarity may refer to whether a term or phrase is positive, negative, and/or neutral. In some embodiments, the polarity may be further broken down into any number of additional categories such as, but not limited to, very positive, positive, moderately positive, slightly positive, neutral, slightly negative, moderately negative, negative, and/or very negative. These phrases may be linked with the scores and/or sentiments associated with such scores. Once trained to recognize the polarity of the sentiment of a number of phrases, the backend service model may then receive new comments and/or other text, compare the content of these new comments (such as phrases identified therein), and determine the polarity of the sentiment of the new comments. The backend service model may then send a message back to a frontend website that indicates the polarity of the sentiment associated with the new comments, enabling the frontend website to provide some response and/or other feedback related to the polarity of the sentiment of the comment.

Figure 1:
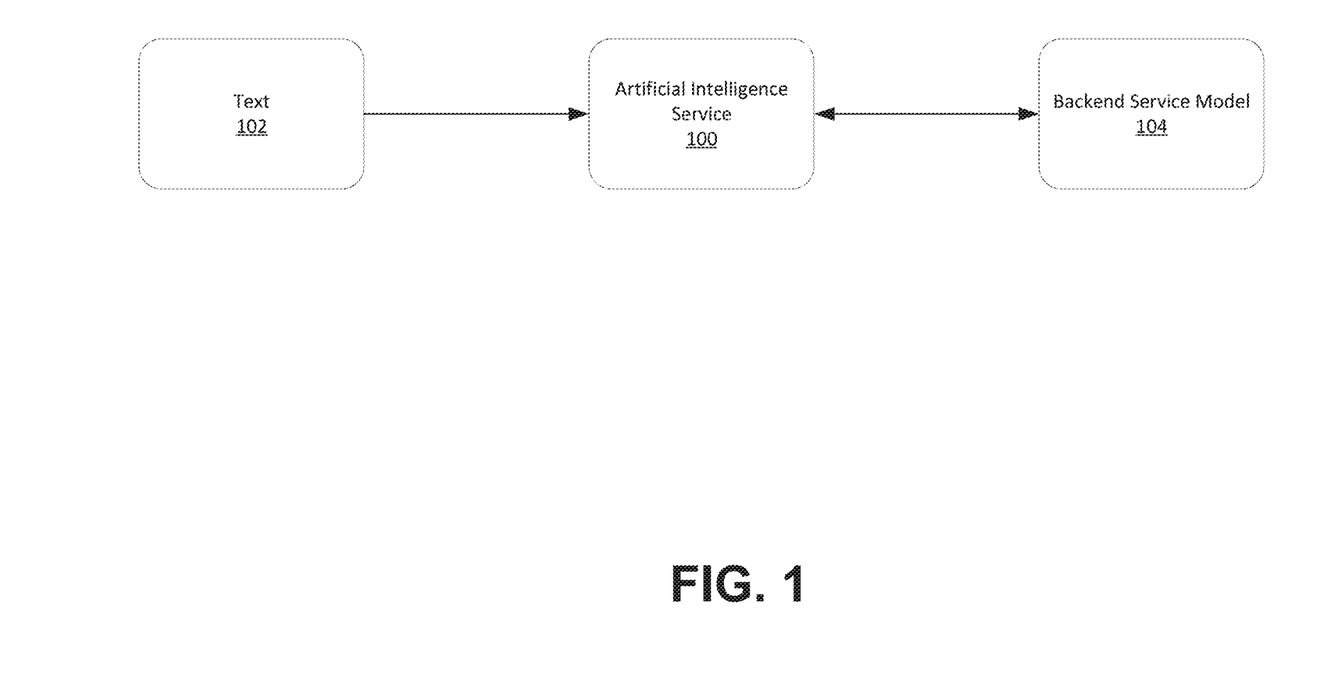
FIG. 1 illustrates a system diagram of a system for providing cloud-based sentiment analysis according to embodiments.

For example, in the embodiment illustrated in FIG. 1, an artificial intelligence (AI) service 100 (which may be in the form of a frontend website) on the Internet cloud, with a text box that allows a user to enter (such as by typing and/or pasting) text 102 with a review or comment (e.g. from a social media post). The AI service 100 may then perform sentiment analysis on the text to indicate a sentiment polarity of the text. For example, the frontend website 100 may send the text to a backend application programming interface (API) endpoint, such as a backend service model 104. The backend service model 104 may include a machine learning model that has been previously trained to identify sentiment polarity of various phrases. The backend service model 104 then analyzes the text and returns a message to the frontend website 102 that indicates whether the analyzed text has a positive or negative sentiment. In response to this message, the frontend website 102 reacts by producing a visible and/or audible response, such as a color change and/or addition of a text and/or graphical response.

Figure 2A:
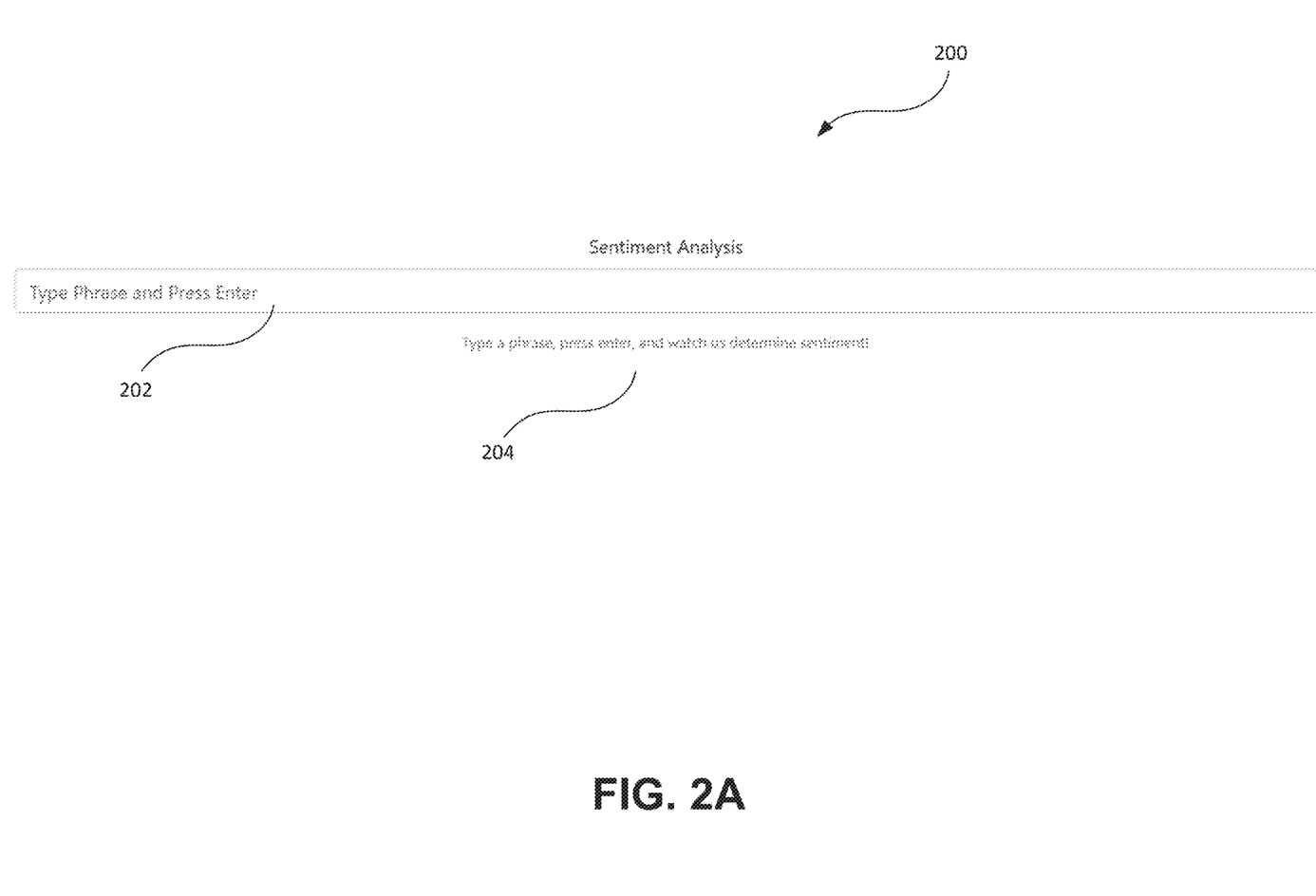
FIG. 2A illustrates a frontend website according to embodiments.
Figure 2B:
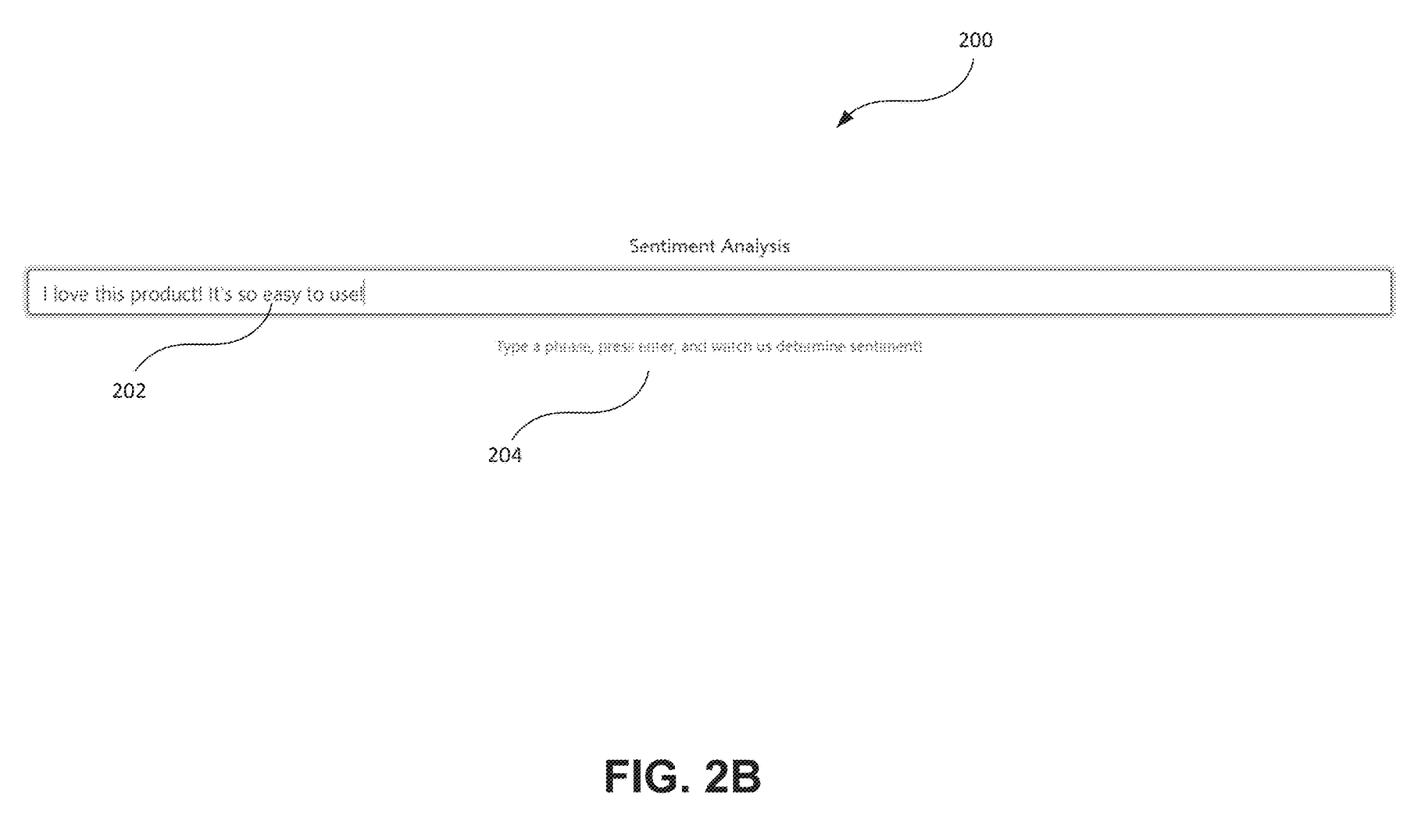
FIG. 2B illustrates the frontend website of FIG. 2A with a comment entered into an input field according to embodiments.

FIGS. 2A-2D illustrate a frontend website 200 (which may be similar to frontend website 102 described above)

that is in communication with a backend service model (not shown). The frontend website 200 may be accessed using any computing device that is connected to a network on which the frontend website 200 is hosted, such as the Internet. As illustrated in FIG. 2A, frontend website 200 includes a text box and/or other input field 202. Input field 202 may include and/or be positioned proximate a prompt 204 for a user to enter a phrase (such as a comment, review, and/or social media post) into the input field 202. The prompt 204 may be positioned within the input field 202, such as using text that disappears and/or fades into the background of the input field 202 (such as by using a semi-transparent font and/or lighter text color) as a user begins entering text into the input field 202. In some embodiments, the prompt 204 may be positioned outside of the input field 202, such as above or below the input field 202. As best seen in FIG. 2B, the user may input any text (and/or other characters, such as emoji, etc.) that the user wishes to have analyzed for sentiment into the input field 202 by keying in, pasting, and/or otherwise entering the characters and/or other characters. The user may then initiate the sentiment analysis by hitting enter, clicking an icon, and/or otherwise interacting with the frontend website 200 to submit the text and/or other characters and trigger commencement of the sentiment analysis.

Once the sentiment analysis is triggered, the frontend website 200 sends any text and/or other characters entered into the input field 202 to a backend service model (such as backend service model 104), which may process the text and/or other characters to determine a polarity of the sentiment of such text and/or other characters. The backend service model may then send a message or command back to the frontend website 200. The frontend website 200 may receive the message or command, which may cause the frontend website 200 to display a response to the text and/or other characters entered into the input field 202. For example, in some embodiments the message or command may include specific instructions on how the frontend website 200 is to respond. In other embodiments, the frontend website 200 may be pre-programmed with instructions to perform a particular action in response to receiving a particular message (such as an indication that the text and/or other character is associated with a positive sentiment or a negative sentiment).

Figure 2C:
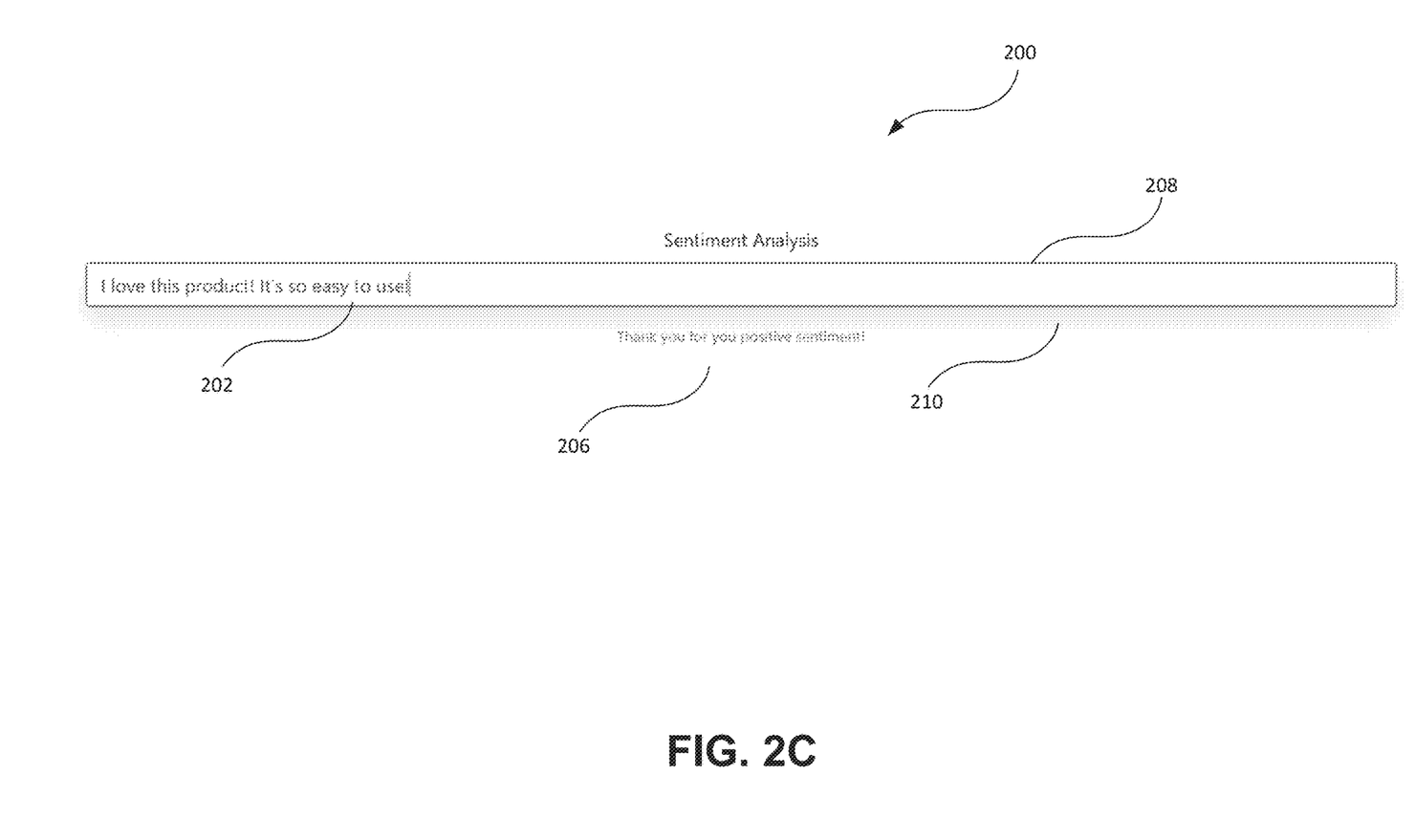
FIG. 2C illustrates the frontend website of FIG. 2A with a positive sentiment response according to embodiments.
Figure 2D:
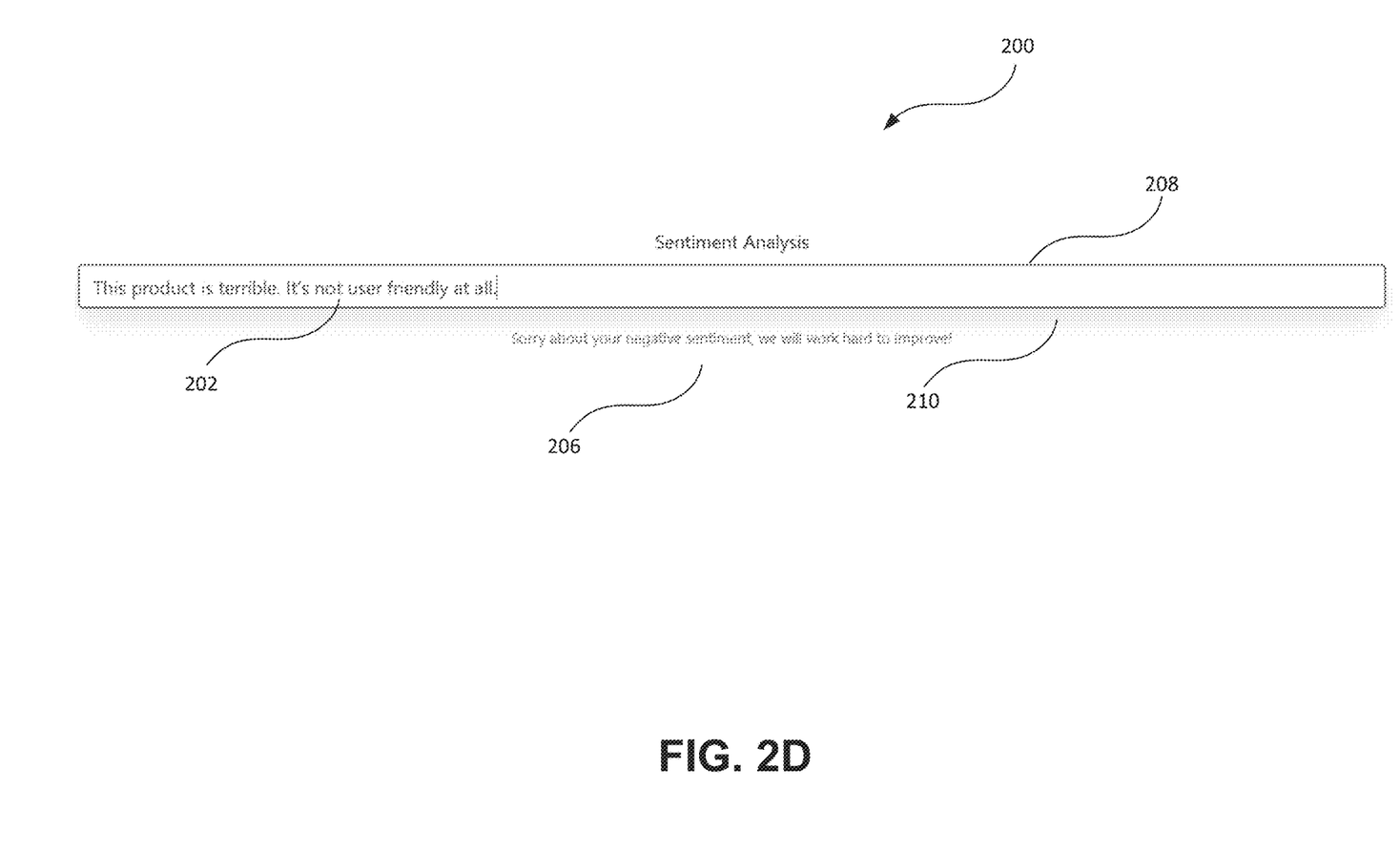
FIG. 2D illustrates the frontend website of FIG. 2A with a negative sentiment response according to embodiments.

The instructions (whether included in the message or command or pre-programmed into the website) may cause the frontend website 200 to display new and/or different content. For example, as illustrated in FIGS. 2C and 2D, the instructions may cause the frontend website 200 to display a particular message 206 that is indicative of the polarity of the sentiment of the text and/or other characters submitted for sentiment analysis. The message 206 may be displayed in the input field 202 as a replacement or in addition to the originally entered, and/or in another area of the frontend website 200. For example, as illustrated here, the message 206 is provided underneath the input field 202. In some embodiments, the message 206 may be a generic message that acknowledges the sentiment of the text and/or other characters. For example, as shown in FIG. 2C the message 206 may be a positive response, such as "Thank you for you positive sentiment!". FIG. 2D illustrates a message 206 having a negative response, such as "Sorry about your negative sentiment, we will work hard to improve!" Such messages 206 may be used to match the general sentiment of the text and/or other characters without being tailored to the specific content of the text and/or other characters. In other embodiments, the message 206 may be tailored to match the specific content of the text and/or other characters. For example, the backend service model may analyze the content of the text and/or other characters as descried elsewhere herein and provide a customized response to the text and/or other characters. For example, for the text entered into the input field in FIG. 2C ("I love this product! It's so easy to use!"), the message 206 may respond to the specific content of the text and may state, for example, "Thank you for rating our product, we are pleased that you enjoy its ease of use.". For the text entered into the input field in FIG. 2D ("This product is terrible. It's not user friendly at all."), the message 206 may respond to the specific content of the text and may state, for example, "We are sorry that you are not satisfied with our product. Please let us know how we can make the product easier to use." In some embodiments, the message 206 may include contact information and/or a link to a means to contact a company and/or other entity with feedback related to a user's comment—positive or negative. For example, the message 206 may include a phone number, email address, social media address, universal source locator (URL) of a contact page, a hashtag, and/or other contact information.

In some embodiments, the instructions may cause the frontend website 200 to color and/or change a color of a portion of the frontend website 200. As illustrated in FIGS. 2C and 2D, a border 208 of the input field is may be bolded, colored, highlighted, and/or otherwise visibly altered based on the polarity of the sentiment of the text and/or other characters entered into the input field 202. For example, the border 208 may be colored green for a positive sentiment or red for a negative sentiment. In some embodiments, along with or instead of altering the border 208, a colored shadow 210 and/or other alteration may be provided, for example, beyond a periphery of the input field 202. As just one example, the shadow 210 may extend downward from the border 208 and fade from a stronger color intensity to a less intense color. It will be appreciated that while illustrated with coloration and/or alterations to the input field 202, border 208, and shadow 210, other alterations may be provided. For example, some or all of any other portion (or the entirety) of the frontend website 200 may be colored in response to the polarity of the sentiment. In some embodiments, a graphic, such as an icon or image may be displayed on the frontend website 200 to indicate a polarity of the sentiment of the text and/or other characters.

In some embodiments, rather than modifying the content of the input screen of the frontend website 200, the frontend website 200 may open a new page of the frontend website 200 in response to receiving the message or command from the backend service model. The new page of the frontend website 200 may include a response message (similar to message 206), coloration, graphics, and/or other items that indicate a polarity of the sentiment associated with the initial text and/or other characters. While illustrated with particular messages 206 and other responses, it will be appreciated that any number of messages 206 and/or other responses may be displayed by the frontend website 200 based on the needs of a particular application and/or based on a content and/or polarity of sentiment of the originally entered text and/or other characters.

Figure 3:
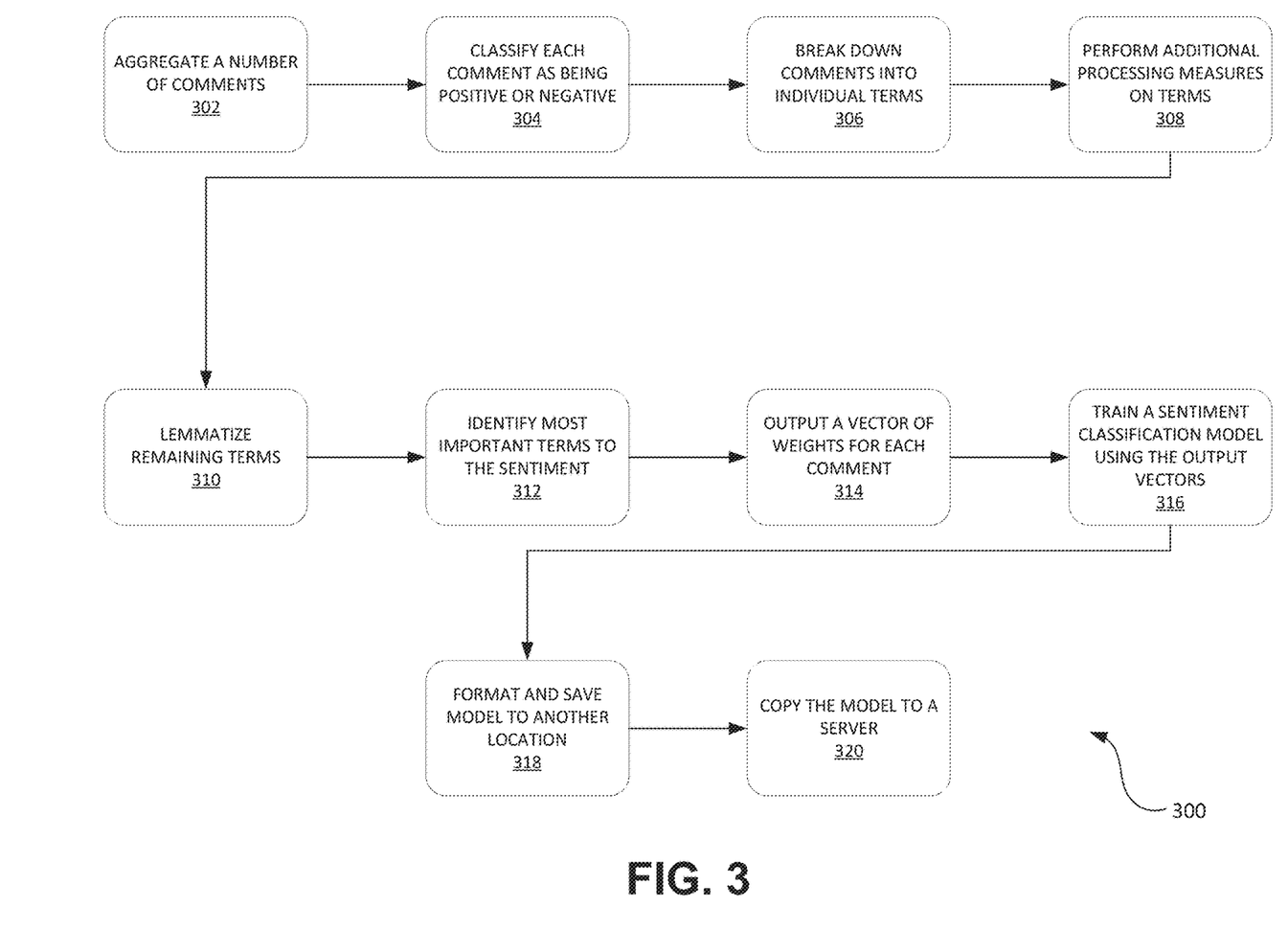
FIG. 3 is a flowchart illustrating a process for training a backend service model analysis according to embodiments.

FIG. 3 is a flowchart illustrating a process 300 for training a backend service model (such as backend service model 104) to perform sentiment analysis. Oftentimes, the backend service model will be operated at by a host server that is remotely located from and in communication with a frontend website, such as frontend website 102 or 200. In some embodiments, the training process 300 may be performed on the server, while in other embodiments, the backend service model may be trained as a local program on a local computing device and later uploaded to a server for cloud computing purposes. At block 302, a number of comments, reviews, and/or other text and/or other characters may be aggregated. This may be done, for example, by pulling or otherwise retrieving the relevant text from one or more sources. For example, the source may be a rating/review website, a website and/or database operated by the entity performing the training and/or sentiment analysis, a mobile application store, a merchant site, etc. In such embodiments, the relevant text may be grouped, tagged, indexed, and/or otherwise organized by topic, so the backend service model may only retrieve data that is pertinent to the particular training application. The backend service model may interface with the source using an API that allows the backend service model to download and/or otherwise access the relevant text. In some embodiments, the source may include a social media site or application. For example, the backend service model may submit a query for social media messages containing a particular data tag, such as a hashtag, which may be returned for analysis.

At block 304, each comment (which may include comments, reviews, and/or other text and/or characters associated with a particular topic) may be classified as being positive or negative, based on the sentiment associated with the respective comment. In some embodiments, this may be done based on a score associated with each of the comments. For example, formal reviews on websites and the like are often associated with a score rating, such as a score from 0 or 1 to 3, 5, 10, etc. These scores or ratings may be provided to the backend service model along with the comments. If such scores are provided, the backend service model may classify each comment as having a positive or negative (or neutral) sentiment based on its associated scored. As just one example, on a scale from 1 to 5, scores of 1 or 2 may be negative, scores of 4 or 5 may be positive, and scores of 3 may be neutral, although it will be appreciated that other scoring techniques may be utilized, including those in which no neutral ratings are provided (which may result, for example, in a score of 3 being classified as either positive or negative). In other embodiments, such as where social media posts are used (or in embodiments where no formal ratings have been assigned), each comment may be reviewed by a human who may input a score. Such scoring may be particularly applicable in cases in which emoji are used. A human may assign various emoji with different scores associated a sentiment the emoji is believed to represent. Any human-generated scoring may be used by the backend service model to classify the related comments as being positive, negative, or neutral. In some embodiments, those comments having neutral sentiments may be eliminated from the training process.

Once the comments have been classified as being positive or negative (or possibly neutral), the various comments may be broken down into individual words, such as by word tokenizing the comments, at block 306. In some embodiments, once the comments are broken up into individual words various processing may be performed to make the comments more uniform, one or more additional processing measures may be performed at block 308. For example, any punctuation may be removed, numbers may be removed or converted into text where appropriate (i.e. converting "2" into "to", "two", or "too" when the context of a comment suggests a user inputted the number to represent a letter and/or word), removing single-letter and/or two-letter words, expanding abbreviations into the full word(s), converting all letters into a single case (i.e. all uppercase or all lowercase), and/or other processing to make the format of each of the comments more uniform. In some embodiments, words that have been deemed irrelevant to the determination of sentiment may be removed, such as by checking the words within the comments against a list (such as a Stop Words list) and removing any words that match those on the list. In some embodiments, before and/or during the processing steps described above, some or all of the comments (or a portion of one or more comments) may need to be translated from one language to another. A machine translation engine may be utilized to detect the language of the comment and automatically translate the text within the comment into a desired language. In other embodiments, if a comment is in a language that is not desired (such as if the backend service model has not been programmed to handle the particular language), such comments may be discarded rather than translated.

At block 310, once the comments and words have gone through any processing, the remaining words may be stemmed or lemmatized, such as by using a part of speech of the words, to group together the inflected forms of a word so they can be analyzed as a single term. Stemming is the process of reducing inflected (or sometimes derived) words to their respective word stem, base or root form, while lemmatization is the algorithmic process of determining the lemma of a word based on its intended meaning. Unlike stemming, lemmatization depends on correctly identifying the intended part of speech and meaning of a word in a sentence and/or larger passage of text. This grouping may help with the sentiment analysis, by ensuring that words of similar meaning are analyzed the same. At this point, the grouped words, polarity of sentiment of the original comments (and by extension, the words derived from the comments), and the original text of the comments may be associated with one another in a database, such as a Python Pandas Dataframe. The database may then be analyzed to identify the most "important" terms at block 312. For example, the terms may be vectorized (converted into numbers) and/or a term frequency inverse document frequency calculation (TF-IDF) may be performed on the database. TF-IDF enables each term to be associated with a number that represents how relevant each word is in a particular comment Comments with similar, relevant terms will have similar vectors. TF-IDF works by increasing proportionally to the number of times a word appears in a document, but is offset by the number of comment that contain the word. So, words that are common in every comment may rank low even though they may appear many times, since they don't mean much to a particular comment However, if a particular term appears many times in a particular comment, while not appearing many times in others, it probably means that the term very relevant. TF-IDF for a term in a comment is calculated by multiplying two different metrics—the "term frequency" of a term in a comment and the "inverse document frequency" of the term across a set of comments There are several ways of calculating the term frequency, with the simplest being a raw count of instances a word appears in a comment In some embodiments, the frequency of the term may be adjusted by length of a document and/or by the raw frequency of the most frequent term in a particular comment The inverse document frequency indicates how common or rare a term is in the entire comment set. The closer the inverse document frequency is to 0, the more common a word is. This metric can be calculated by taking the total number of comments, dividing the total number by the number of comments that contain a particular term, and calculating the logarithm. So, if the term is very common and appears in many comments, this number will approach 0, otherwise, it will approach 1. Multiplying these two numbers results in the TF-IDF score of a term in a comment The higher the score, the more relevant that word is in that particular comment After the importance of the various terms has been determined, a vector of lemmas (or other terms) and TF-IDF (or similar) weights for each comment is output at block 314. A sentiment classification model may be trained using these outputs at block 316. For example, the model may be trained to recognize certain phrases (terms and/or groupings of terms) and correlate the phrases with a particular sentiment based on the scores of the original comments. The vector of lemmas (or other terms) may be used as an input to the model and the related sentiment polarity as the model output to train the model, such as by using a logistic regression algorithm. In some embodiments, the model may be ready to use. In other embodiments, the trained model may be output and formatted to be saved to another location at block 318. In some embodiments, the model may be output as a Python pickle object, which "serializes" the object first before writing it to file by converting a python object into a character stream. The resulting character stream contains all the information necessary to reconstruct the object in another python script. This allows the object (here the classification model) to be saved to a disk. At block 320, the pickle (or otherwise formatted classification model) may be copied to a server for use as a cloud-based sentiment analysis script tool that takes text and/or character-based inputs and provides outputs related to a polarity of the sentiment of the input.

Figure 4:
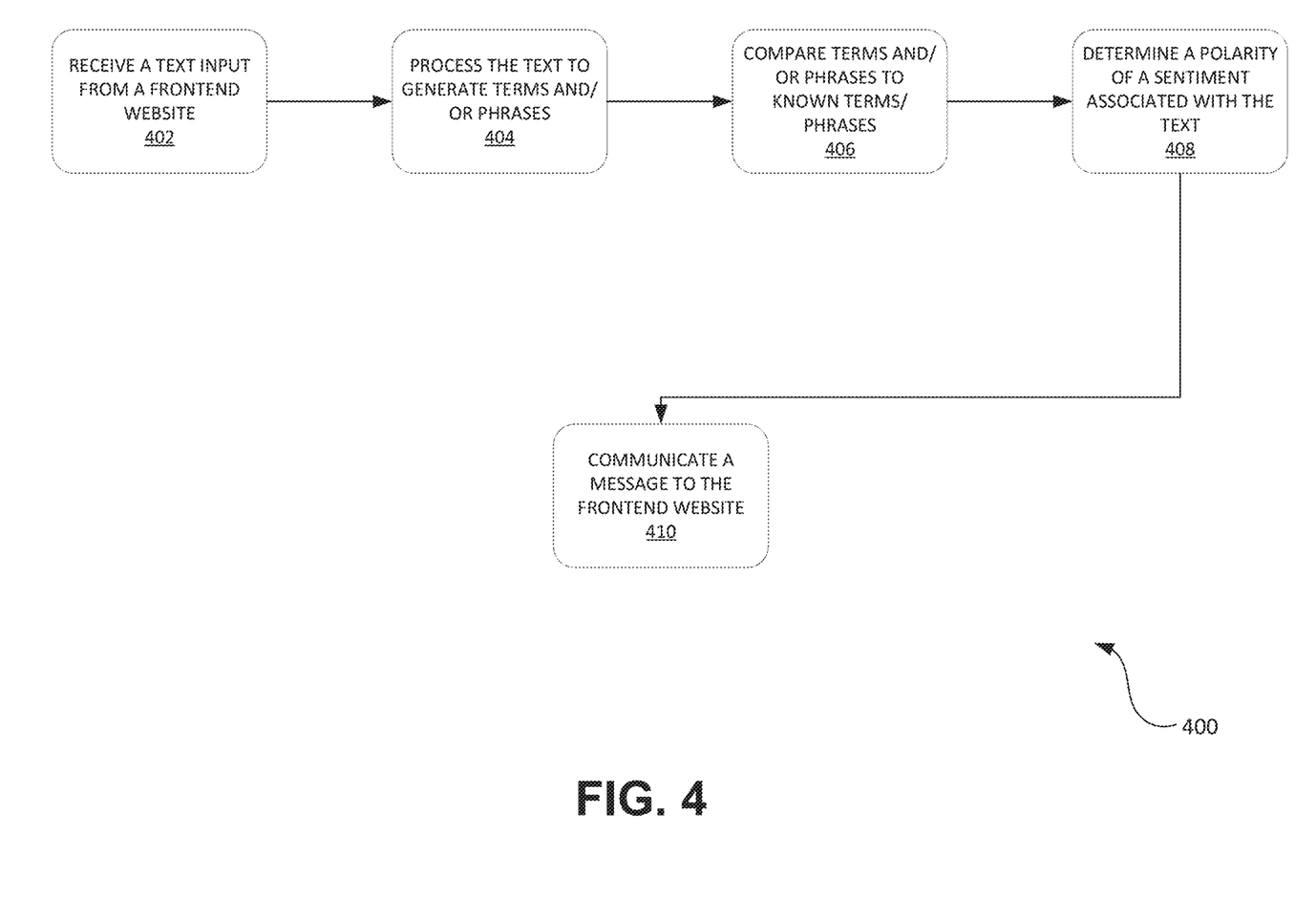
FIG. 4 is a flowchart illustrating a process for providing cloud-based sentiment analysis according to embodiments.

FIG. 4 is a flowchart illustrating a process 400 for analyzing the sentiment of a comment or phrase. Process 400 may be performed using a backend service model, such as backend service model 104, which may be trained using a process similar to process 300 described above. Process 400 may begin at block 402 by receiving a text and/or other character input from a frontend website (such as frontend website 102 or 200). The input of text and/or other characters may have been keyed, pasted, and/or otherwise entered into the frontend website, which may then pass the text and/or other characters to the backend service model for analysis. The backend service model may then process the text and/or other characters at block 404. For example, the text and/or other characters may be broken down into individual words, such as by word tokenizing the comments. In some embodiments, once the text is broken up into individual words, further processing may be performed, such as removing any punctuation, removing any numbers and/or converting numbers into text where appropriate, removing single-letter and/or two-letter words, expanding any abbreviations into the full word(s), converting all letters into a single case (i.e. all uppercase or all lowercase), and/or other processing. In some embodiments, words that have been deemed irrelevant to the determination of sentiment may be removed, such as by checking the words within the comments against a list (such as a Stop Words list) and removing any words that match those on the list. Any remaining words may be stemmed or lemmatized, such as by using a part of speech of the words, to group together the inflected forms of a word so they can be analyzed as a single term. In some embodiments, before and/or during the processing steps described above, the text and/or other characters (or a portion thereof) may need to be translated from one language to another. A machine translation engine may be utilized to detect the language of the text and/or other characters and automatically translate the text within the text and/or other characters into a desired language.

The backend service model may then compare the resulting terms to those in a database of known terms/phrases at block 406, where each of the known terms/phrases is associated with a particular polarity of sentiment. Based on the comparison, the backend service model determines the polarity of a sentiment associated with the original text and/or other characters at block 408. At block 410, the backend service model may then communicate a message and/or command to the frontend website from which the text and/or other characters were received. The message may cause the frontend website to display a response to the text and/or other characters submitted for analysis. In some embodiments the message or command may include specific instructions on how the frontend website is to respond while in other embodiments the frontend website may be pre-programmed with instructions to perform a particular action in response to receiving a particular message (such as an indication that the text and/or other character is associated with a positive sentiment or a negative sentiment). The message may cause the frontend website to display a particular message (either generic or tailored to the specific content of the text and/or other characters) that is indicative of the polarity of the sentiment of the text and/or other characters submitted for sentiment analysis, to color and/or change a color of a portion of the frontend website, to display an icon or image to indicate a polarity of the sentiment of the text and/or other characters, to open a new page of the frontend website, and/or otherwise display new and/or different content.

In some embodiments, a phrase within the text and/or other characters entered into the frontend website may include and/or consist only of a non-text based message, such as an emoji. In such embodiments, the frontend website may pass the emoji and/or a character string representing the emoji to the backend service model. The backend service model may compare the emoji and/or the character string to known emoji and/or character strings representing known emoji (which are known from the comments used to train the backend service model) to determine the sentiment and polarity thereof associated with the particular emoji. Based on this comparison, the backend service model may then return a message to the frontend website that indicates the polarity of the sentiment of the emoji.

In some embodiments, if a particular phrase is unrecognized (i.e., the phrase does not match and/or is not similar to any phrases that were analyzed during training of the backend service model), the backend service model may be programmed to return a particular default message. For example, in some embodiments, the backend service model may be configured to provide a message to the frontend website indicating that the sentiment cannot be determined. In some embodiments, the message (or instructions at the frontend website) may indicate that the frontend website should display a generic message, such as a message stating "Thank you for your feedback", rather than a message tied to a particular polarity of sentiment. Other text, images, coloration, and/or modification of the frontend website may be triggered based on an unrecognized sentiment. It will be appreciated that other methods of handing unrecognized sentiments may be utilized to meet the needs of a particular application.

Figure 5:
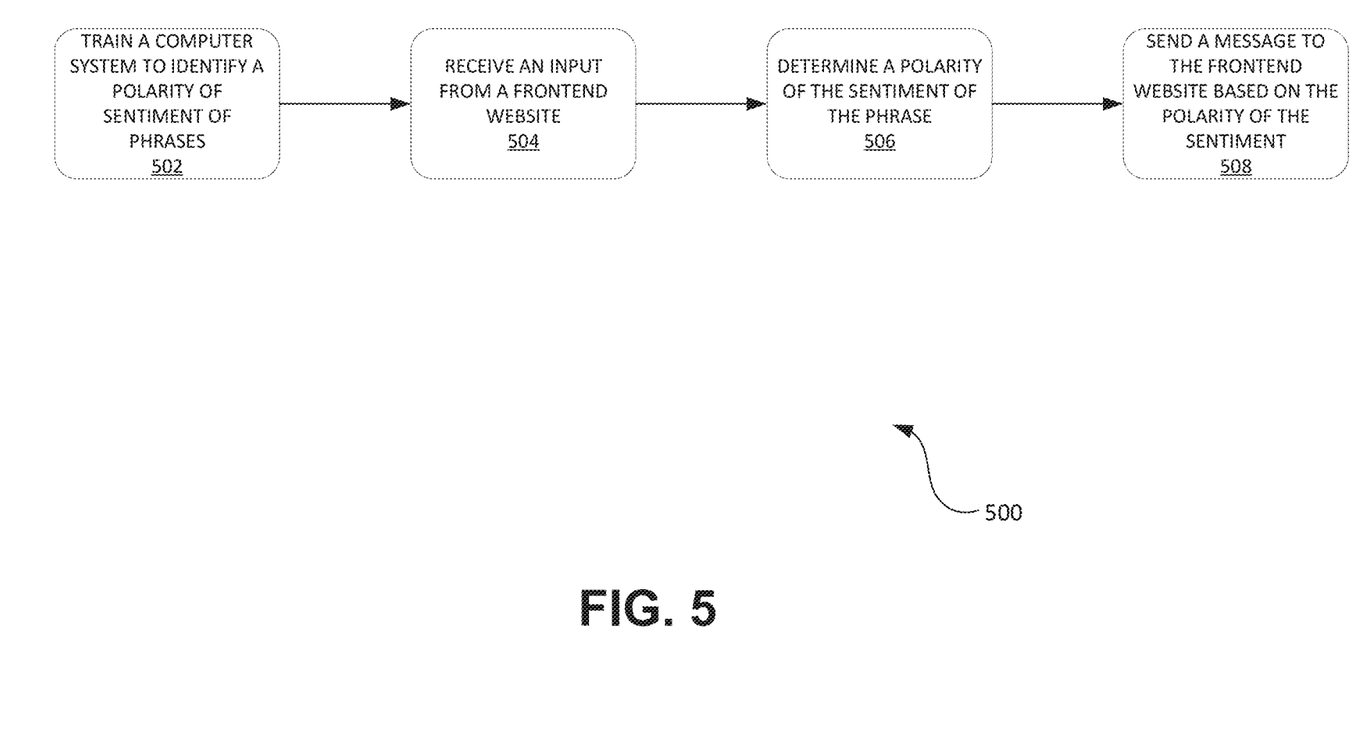
FIG. 5 is a flowchart illustrating a process for providing cloud-based sentiment analysis according to embodiments.

FIG. 5 illustrates a flowchart of a process 500 for providing sentiment analysis. Process 500 may be performed by a backend service model, such as backend service model 104. Process 500 may begin at block 502 by training a computer system to identify a polarity of a sentiment for a plurality of phrases. The training may be similar to the training process 300 described above and may include any of the steps disclosed in relation to process 300. For example, training the computer system may include classifying each of a plurality of comments as being positive or negative based on scores associated with each of the plurality of comments (such as using human-assigned scored that have been associated with each comment), generating the plurality of phrases from the plurality of comments, and assigning each of the plurality of phrases the polarity of the sentiment based at least in part on the scores associated with each of the plurality of comments. To generate the plurality of phrases, the backend service model may remove one single-letter words, two-letter words, words on a pre-defined list, punctuation, and/or numbers from each of the plurality of comments to form sets of remaining words for each of the plurality of comments. In some embodiments, the backend service model may also lemmatize the sets of remaining words for each of the plurality of comments to generate the plurality of phrases (which may include one or more terms). In some embodiments, some or all of the comments used for training purposes may be translated from one language to another language. In some embodiments, training the computer system also includes removing comments that are classified as being neutral.

At block 504, after being trained, the computer system may receive an input from a frontend website. The input may include a text string including a phrase, which may be in the form of one or more words, numbers, emoji, and/or other characters. In some embodiments, process 500 may include extracting the phrase from the text string by removing one or more of single-letter words, two-letter words, words on a pre-defined list, punctuation, or numbers from the text string. Any remaining words of the phrase. In some embodiments, some or all of words in the text string may be translated from one language to another language. At block 506, process 500 includes determining, by the computer system, the polarity of the sentiment of the phrase by comparing the phrase to the plurality of phrases that were analyzed during the training process. This comparison allows the backend service model to determine a polarity (positive or negative) of the sentiment of the text-based string based on the phrases derived from the text-based string. The backend service model may then send a message or command to the frontend website that causes the website to display predetermined content based on the determined polarity of the sentiment of the phrase at block 508. In some embodiments the message or command may include specific instructions on how the frontend website is to respond while in other embodiments the frontend website may be pre-programmed with instructions to perform a particular action in response to receiving a particular message. The predetermined content may be selected based at least in part on the polarity of the sentiment of the phrase and, in some instances, on the content of the phrase. For example, generic content may be displayed when only the polarity of the sentiment is used, while tailored content may be provided when an actual content of the text-based string is utilized. The predetermined content a pre-determined text-based message, a color being displayed around the input, an icon and/or image to indicate a polarity of the sentiment of the text-based string, a new page of the frontend website, and/or other content. In some embodiments, the predetermined content may also include contact information that allows a user to provide feedback to an entity operating the frontend website and/or backend service model.

Figure 6:
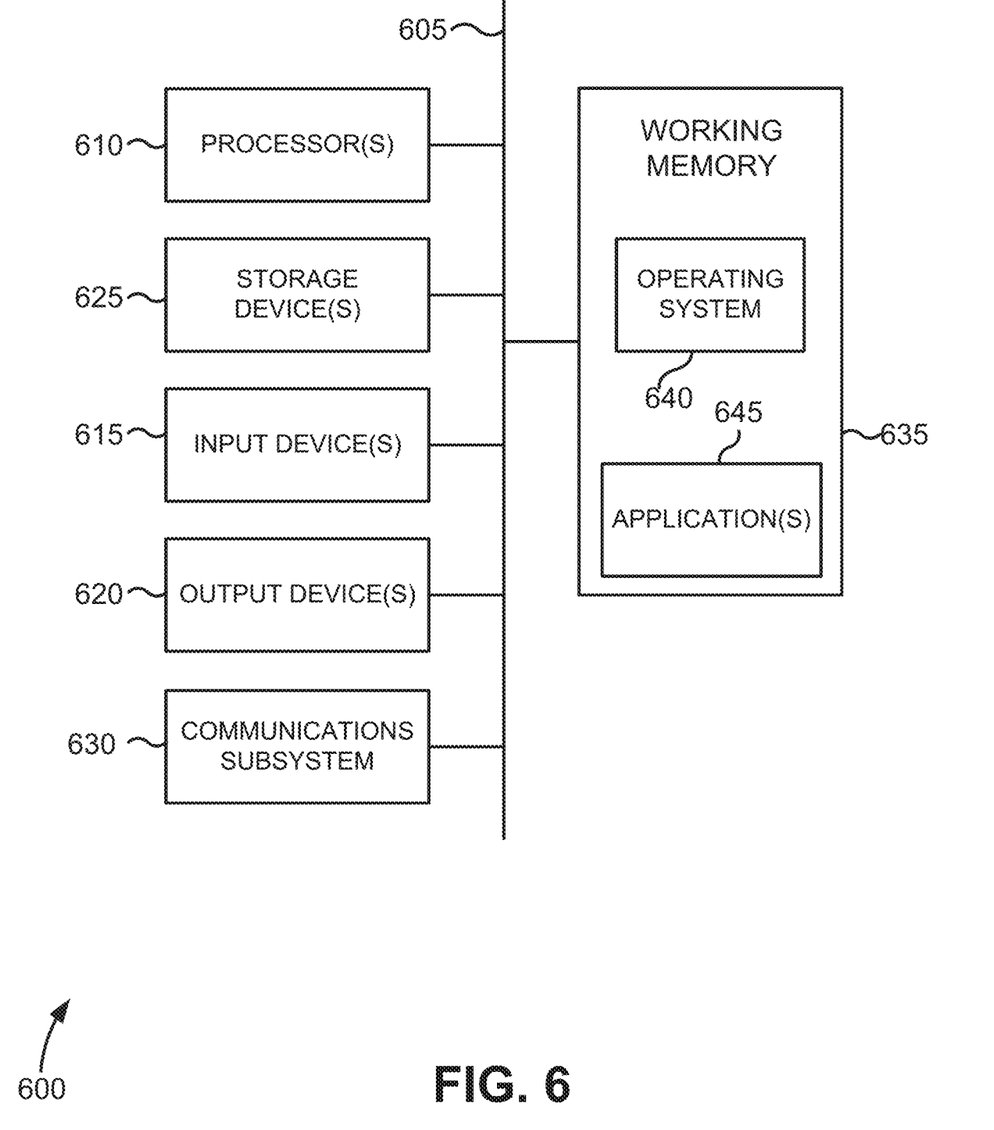
FIG. 6 illustrates a block diagram of a computing system according to embodiments.

A computer system as illustrated in FIG. 6 may be incorporated as part of the previously described computerized devices. For example, computer system 600 can represent some of the components of computing devices, such as servers that host the backend service model and/or frontend websites described herein. FIG. 6 provides a schematic illustration of one embodiment of a computer system 600 that can perform the methods provided by various other embodiments, as described herein. FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include a processing unit 610, including without limitation one or more processors, such as one or more special-purpose processors (such as digital signal processing chips, graphics acceleration processors, and/or the like); one or more input devices 615, which can include without limitation a keyboard, a touchscreen, receiver, a motion sensor, a camera, a smartcard reader, a contactless media reader, and/or the like; and one or more output devices 620, which can include without limitation a display device, a speaker, a printer, a writing module, and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communication interface 630, which can include without limitation a modem, a network card (wireless or wired), an infrared communication device, a wireless communication device and/or chipset (such as a Bluetooth™ device, an 502.11 device, a Wi-Fi device, a WiMAX device, an NFC device, cellular communication facilities, etc.), and/or similar communication interfaces. The communication interface 630 may permit data to be exchanged with a network (such as the network described below, to name one example), other computer systems, and/or any other devices described herein. In many embodiments, the computer system 600 will further comprise a non-transitory working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a computing device to a special purpose computer that is configured to perform one or more operations in accordance with the described methods.

A set of these instructions and/or code might be stored on a computer-readable storage medium, such as the storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure and/or adapt a special purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 610, applications 645, etc.) Further, connection to other computing devices such as network input/output devices may be employed.

Some embodiments may employ a computer system (such as the computer system 600) to perform methods in accordance with the disclosure. For example, some or all of the procedures of the described methods may be performed by the computer system 600 in response to processing unit 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the storage device(s) 625. Merely by way of example, execution of the sequences of instructions contained in the working memory 635 might cause the processing unit 610 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processing unit 610 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 625. Volatile media include, without limitation, dynamic memory, such as the working memory 635. Transmission media include, without limitation, coaxial cables, copper wire, and fiber optics, including the wires that comprise the bus 605, as well as the various components of the communication interface 630 (and/or the media by which the communication interface 630 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a non-transitory storage device 625 either before or after execution by the processing unit 610.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

The methods, systems, devices, graphs, and tables discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein. As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method of providing sentiment analysis, comprising:
   training a computer system to identify a polarity of a sentiment for a plurality of phrases;
   receiving, at the computer system, an input from a website, the input comprising a text string including an input phrase;
   determining, by the computer system, the polarity of the sentiment of the input phrase by comparing the input phrase to the plurality of phrases, wherein the computer system determines that the polarity of the sentiment is unrecognized when the input phrase does not correspond to the one or more phrases of the plurality of phrases; and
   sending, by the computer system, a command to the website that causes the website to display predetermined content based on the determined polarity of the sentiment of the phrase, wherein:
     the predetermined content comprises a predetermined text-based message that is selected based at least in part on the polarity of the sentiment of the input phrase;
     when the polarity of the sentiment of the input phrase is negative, the predetermined text-based message comprises contact information of an entity associated with the input phrase; and
     when the polarity of the sentiment of the input phrase is unrecognized, the predetermined text-based message comprises a generic text-based message that is not tied to a particular polarity of sentiment.

2. The method of providing sentiment analysis of claim 1, wherein:
   training the computer system comprises:
     classifying each of a plurality of comments as being positive or negative based on scores associated with each of the plurality of comments;
     generating the plurality of phrases from the plurality of comments; and
     assigning each of the plurality of phrases the polarity of the sentiment based at least in part on the scores associated with each of the plurality of comments.

3. The method of providing sentiment analysis of claim 2, wherein:
   generating the plurality of phrases comprises:
     removing one or more of single-letter words, two-letter words, words on a pre-defined list, punctuation, or numbers from each of the plurality of comments to form sets of remaining words for each of the plurality of comments; and
     lemmatizing the sets of remaining words for each of the plurality of comments to generate the plurality of phrases.

4. The method of providing sentiment analysis of claim 2, wherein:
   training the computer system further comprises removing comments that are classified as being neutral.

5. The method of providing sentiment analysis of claim 1, further comprising:
   extracting the input phrase from the text string by removing one or more of single-letter words, two-letter words, words on a pre-defined list, punctuation, or numbers from the text string; and lemmatizing any remaining words of the input phrase prior to determining the polarity of the sentiment of the input phrase.

6. A computing system for providing sentiment analysis, comprising:
a communications interface that is in communication with a website;
a processor; and
a memory having instructions stored thereon that, when executed by the processor, cause the processor to:
train the computer system to identify a polarity of a sentiment for a plurality of phrases;
receive, using the communications interface, an input from the website, the input comprising a text string including am input phrase;
determine the polarity of the sentiment of the phrase by comparing the input phrase to the plurality of phrases, wherein the computer system determines that the polarity of the sentiment is unrecognized when the input phrase does not correspond to the one or more phrases of the plurality of phrases; and
send, using the communications interface, a command to the website that causes the website to display predetermined content based on the determined polarity of the sentiment of the phrase, wherein:
the predetermined content comprises a predetermined text-based message that is selected based at least in part on the polarity of the sentiment of the input phrase;
when the polarity of the sentiment of the input phrase is negative, the predetermined text-based message comprises contact information of an entity associated with the phrase; and
when the polarity of the sentiment of the input phrase is unrecognized, the predetermined text-based message comprises a generic text-based message that is not tied to a particular polarity of sentiment.

7. The computing system for providing sentiment analysis of claim 6, wherein:
the predetermined content comprises a color being displayed around the input, the color being selected based on the polarity of the sentiment of the input phrase.

8. The computing system for providing sentiment analysis of claim 6, wherein the instructions are further configured to cause the processor to:
translate the text string into a different language prior to determining the polarity of the sentiment of the input phrase.

9. The computing system for providing sentiment analysis of claim 6, wherein:
training the computer system comprises:
classifying each of a plurality of comments as being positive or negative based on scores associated with each of the plurality of comments;
generating the plurality of phrases from the plurality of comments; and
assigning each of the plurality of phrases the polarity of the sentiment based at least in part on the scores associated with each of the plurality of comments.

10. The computing system for providing sentiment analysis of claim 9, wherein:
generating the plurality of phrases comprises:
removing one or more of single-letter words, two-letter words, words on a pre-defined list, punctuation, or numbers from each of the plurality of comments to form sets of remaining words for each of the plurality of comments; and
lemmatizing the sets of remaining words for each of the plurality of comments to generate the plurality of phrases.

11. The computing system for providing sentiment analysis of claim 6, wherein the instructions further cause the processor to:
extract the input phrase from the text string by removing one or more of single-letter words, two-letter words, words on a pre-defined list, punctuation, or numbers from the text string; and
lemmatize any remaining words of the input phrase prior to determining the polarity of the sentiment of the input phrase.

12. A non-transitory computer-readable medium having instructions stored thereon that, when executed, cause a computing device to:
train the computing device to identify a polarity of a sentiment for a plurality of phrases;
receive an input from a web site, the input comprising a text string including an input phrase;
determine the polarity of the sentiment of the phrase by comparing the input phrase to the plurality of phrases, wherein the computer device determines that the polarity of the sentiment is unrecognized when the input phrase does not correspond to the one or more phrases of the plurality of phrases; and
send a command to the website that causes the website to display predetermined content based on the determined polarity of the sentiment of the phrase, wherein:
the predetermined content comprises a predetermined text-based message that is selected based at least in part on the polarity of the sentiment of the input phrase;
when the polarity of the sentiment of the input phrase is negative, the predetermined text-based message comprises contact information of an entity associated with the phrase; and
when the polarity of the sentiment of the input phrase is unrecognized, the predetermined text-based message comprises a generic text-based message that is not tied to a particular polarity of sentiment.

13. The non-transitory computer-readable medium of claim 12, wherein the instructions are further configured to cause the computing device to:
translate the text string into a different language prior to determining the polarity of the sentiment of the input phrase.

14. The non-transitory computer-readable medium of claim 12, wherein:
training the computing device comprises:
classifying each of a plurality of comments as being positive or negative based on scores associated with each of the plurality of comments;
generating the plurality of phrases from the plurality of comments; and
assigning each of the plurality of phrases the polarity of the sentiment based at least in part on the scores associated with each of the plurality of comments.

15. The non-transitory computer-readable medium of claim 14, wherein:
generating the plurality of phrases comprises:
removing one or more of single-letter words, two-letter words, words on a pre-defined list, punctuation, or numbers from each of the plurality of comments to form sets of remaining words for each of the plurality of comments; and lemmatizing the sets of remaining words for each of the plurality of comments to generate the plurality of phrases.

16. The non-transitory computer-readable medium of claim 12, wherein the instructions further cause the computing device to:
    extract the input phrase from the text string by removing one or more of single-letter words, two-letter words, words on a pre-defined list, punctuation, or numbers from the text string; and
    lemmatize any remaining words of the input phrase prior to determining the polarity of the sentiment of the input phrase.

17. The non-transitory computer-readable medium of claim 12, wherein:
    the predetermined content comprises one or more of a textual response to the input phrase or a color being displayed around the input, the color being selected based on the polarity of the sentiment of the input phrase.

* * * * *